July 11, 1944.  W. F. BOKUM ET AL  2,353,541
COMPENSATOR FOR AUTOMATIC FEEDS
Filed Jan. 21, 1942  2 Sheets-Sheet 1

Inventors
William F. Bokum
John W. Weber
By their Attorneys
Howson & Howson

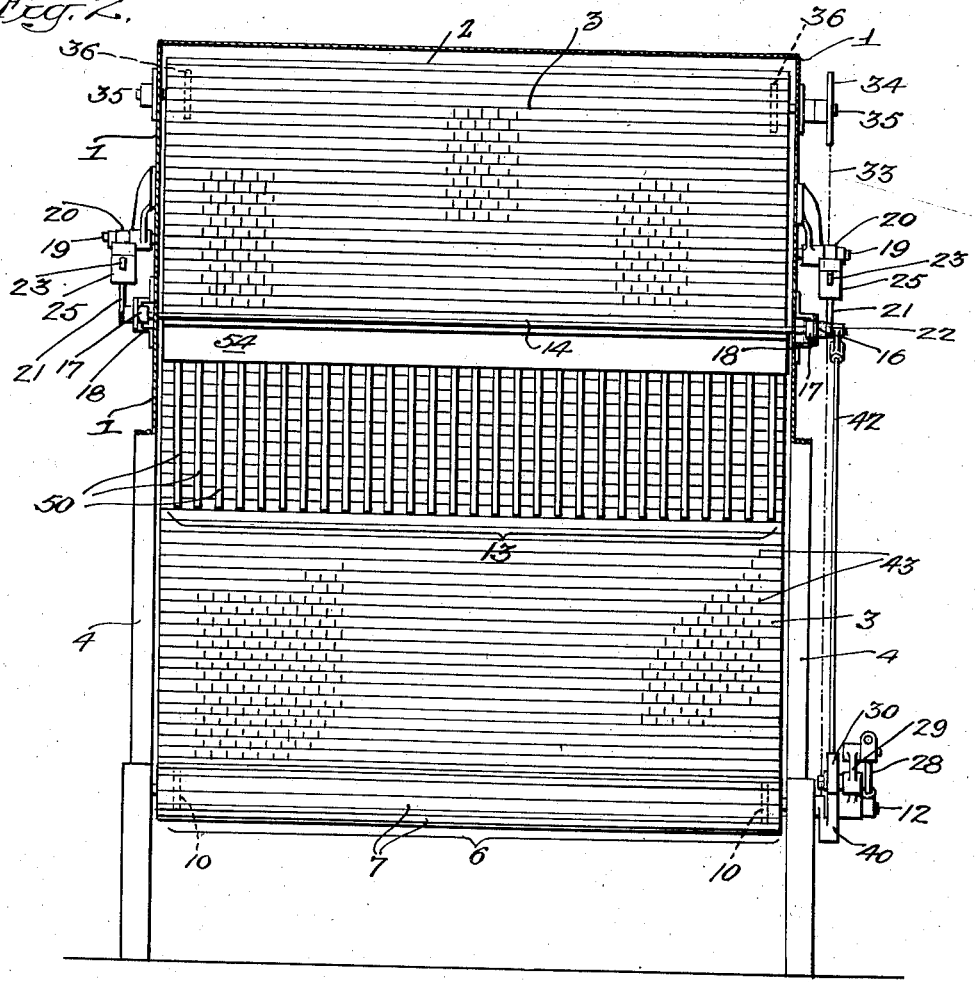

Patented July 11, 1944

2,353,541

UNITED STATES PATENT OFFICE 2,353,541

COMPENSATOR FOR AUTOMATIC FEEDS

William F. Bokum, Jenkintown, and John W. Weber, Philadelphia, Pa., assignors to Proctor & Schwartz, Incorporated, Philadelphia, Pa., a corporation of Pennsylvania Application January 21, 1942, Serial No. 427,668

16 Claims. (Cl. 19—69)

This invention relates to a device for feeding fibrous stock to a carding or Garnett machine, drier, squeeze rolls, conveyer or other apparatus, in the form of a web or layer of uniform width, weight, thickness and density; and more especially to mechanism for compensating for irregularities or variations in the homogeneity of the mass or bulk of stock from which the web or layer is to be produced.

More specifically, the present invention relates to means for uniformitizing a layer of wool, cotton, or other animal, vegetable, or synthetic fibres, alone or in predetermined mixture, on the spike apron of a weighing feeder adapted for supplying stock to a Garnett or carding machine.

One object of the present invention is to provide a layer of stock of uniform width and uniform weight, per square unit of its area, on the spike apron of the feeder, regardless of the volume of stock contained in the main hopper of the feeder, and until substantially all of the stock is removed from the hopper by the apron.

Another object of the invention is to provide a movable floor in the main hopper, and mechanism for advancing the floor and the entrained stock toward the base of the upwardly-rising spike apron, whereby the stock will be caught and raised by the spikes of the apron, and whereby necessity for pushing the stock in the hopper toward and against the apron, by hand, will be eliminated; and whereby the hopper may be of considerably greater capacity than heretofore to save time normally required for frequent replenishing.

Another object of the invention is to provide a supplementary hopper, within the main hopper, to be fed with stock directly from the main hopper, by the spike apron, and also with superfluous stock removed from the spike apron by the leveling comb of the feeler to effect an accumulation of stock therein.

Another object of the invention is to provide the supplementary hopper with a movable wall which will travel toward and away from the spike apron, as the accumulation of stock in the supplementary hopper increases or diminishes, and to utilize the reactionary movements of this movable wall to control the movements of the traveling floor of the main hopper, for delivering more or less stock to the base of the upwardly-rising spike apron, as required, and thereby maintain a predetermined amount of stock in the supplementary hopper.

Another object of the invention is to support the movable wall of the supplementary hopper on a carriage mounted on tracks carried by the end walls of the main hopper, for bodily movement toward and away from the spike apron, and to provide retrogressive means of constant force for continuously urging the movable wall toward the spike apron, to maintain the stock in the supplementary hopper under constant uniform pressure against the face of the spike apron, as the accumulation of stock in the supplementary hopper increases and diminishes.

Another object of the invention is to form the movable wall of the supplementary hopper of a series of relatively-movable, adjacently-disposed parts, such as fingers, and to attach each finger individually to the carriage resiliently, whereby differences in the resiliency, density, and volume of adjacent parts of the stock accumulated in the supplementary hopper will be compensated for, without affecting the uniformity of pressure exerted upon the mass of stock being pressed as a whole against the spike apron by the movable wall.

The construction and operation of the device forming the subject matter of the present invention will be fully disclosed hereinafter, reference being had to the accompanying drawings, of which:

Fig. 2 is a transverse sectional elevation taken on the line 2—2, Fig. 1;

The present invention is adapted for use in a conventional type of weighing feeder, such, for example, as that disclosed in the present assignee's prior patent to William F. Bokum, one of the present applicants, No. 1,660,240, dated February 21, 1928, in place of the hopper structure disclosed therein and in the prior United States Patent No. 2,261,049, dated October 28, 1941, in which the present William F. Bokum is named as the inventor.

Figure 1:
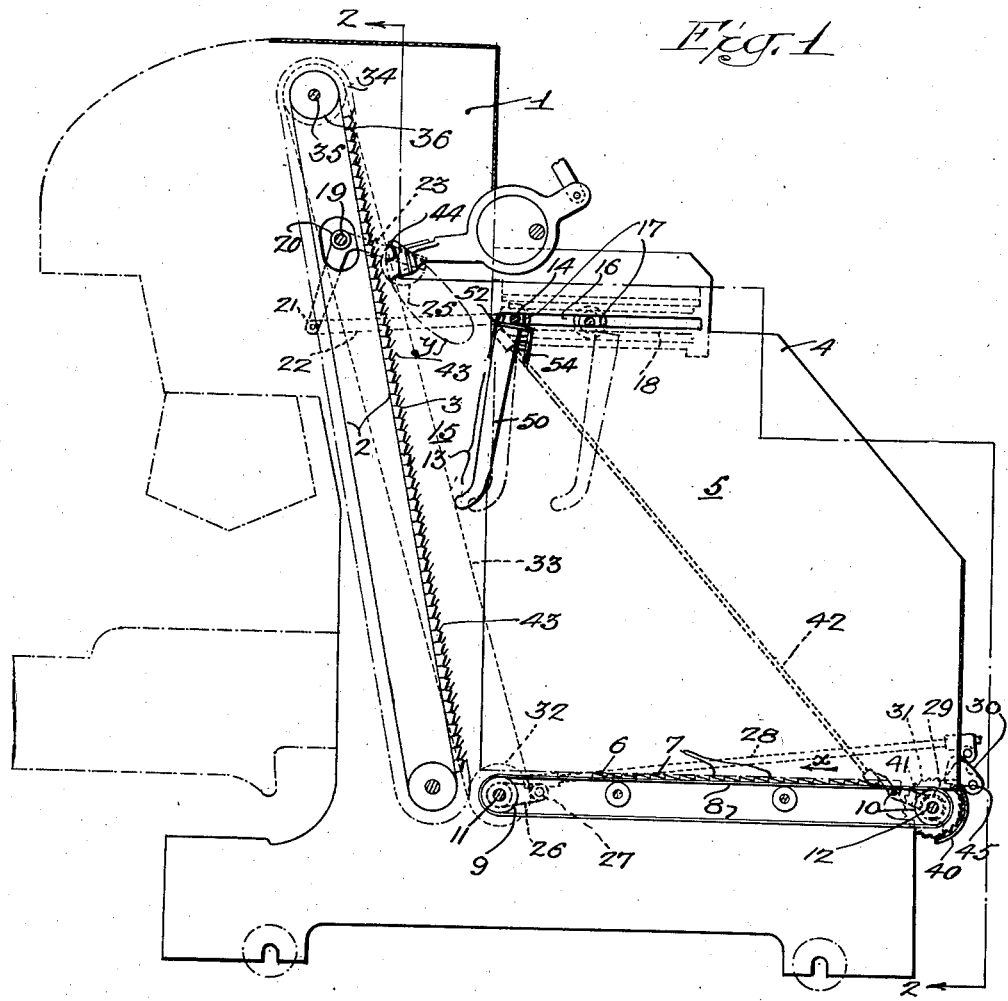
Fig. 1 is a vertical sectional elevation of a sufficient portion of a conventional weighing feeder to illustrate the application of the present invention thereto.
Figure 3:
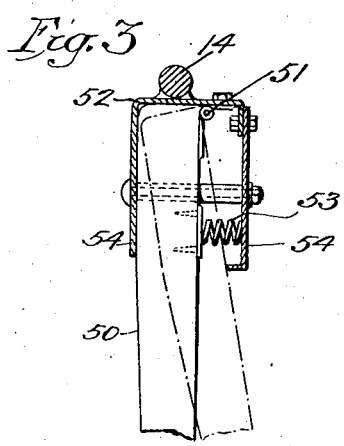
Fig. 3 is a sectional elevation of a detail of the invention.

As shown in Fig. 1 of the present drawings, one of the side frames of a weighing feeder of the type disclosed in the above-mentioned prior patents is illustrated at 1. Operatively-mounted between the two relatively-spaced, parallel side frames 1, of the weighing feeder, is the usual spike apron 2. As usual, the spike apron 2 is arranged with the carrying run 3 thereof disposed at a relatively steep angle and adapted to move upwardly, in the usual manner and for the usual purpose, i. e. to remove stock from the hopper and deliver it to the scale pan of the weighing feeder.

Secured to the rear edges of the side frames 1 are the side or end plates 4 of the main hopper 5. The floor of the main hopper 5 is composed of an endless belt 6. In the present instance, the movable floor 6 of the hopper 5 is provided with transversely-extending slats 7, said slats being secured to flexible belts or chains 8 which pass around rollers or sprockets 9 and 10. The rollers or sprockets 9 and 10 are secured to transversely-extending shafts 11 and 12, respectively, which are mounted in suitable bearings carried by the side frames 1 or the end plates 4 of the hopper.

Extending transversely of the hopper 5, between the end plates 4, 4 thereof, in laterally-spaced relation to the carrying run 3 of the spike apron 2, is a movable wall 13, between which, and the carrying run 3, is formed the supplementary hopper 15.

The movable wall 13 of the supplementary hopper 15 is carried by a transversely-extending bar 14 which forms part of a carriage which includes side or end trucks 16, 16 having anti-friction rollers 17, 17 adapted to ride on rails 18 carried by the end plates 4, 4, respectively, of the hopper 5.

Pivotally mounted in the side frames 1, 1 and extending transversely of the feeder, is a shaft 19 to which is secured, adjacent one or each of the side frames 1, a bell-crank lever 20. One arm 21 of the bell-crank lever 20 is connected by a link 22 to the adjacent carriage truck 16. Adjustably mounted on the second arm 23 of the bell-crank lever 20, is a counter-weight 25. The counter-weight or weights 25, through the bell-crank lever or levers 20 and link or links 22, constantly urge the movable wall 13 toward the upwardly moving carrying run 3 of the spike apron 2.

Loosely mounted on the shaft 11, which supports one end of the movable floor 6 of the main hopper 5, is a crank 26. Rotatably-mounted on the crank pin 27 of the crank 26 is one end of a reach rod 28, the second end of which is pivotally connected to the outer end of a lever 29. The lever 29 is loosely mounted on the shaft 12 which supports the opposite end of the movable floor 6 of the main hopper 5. Pivotally mounted on the lever 29 is a pawl 30, which is adapted to engage the teeth of a ratchet wheel 31 secured to the shaft 12.

The crank 26 is secured to a sprocket wheel 32, which is freely rotatable on the shaft 11. The sprocket 32 is driven, through a sprocket chain 33, from a sprocket 34 secured to the shaft 35. Also secured to the shaft 35 are the rolls or sprockets 36 which support the upper end of and drive the spike apron 2.

Power is applied to the shaft 35 from any suitable source, not shown. With each rotation of the crank 26, the lever 29 is rocked about the shaft 12 and, with the pawl 30 arranged for normal engagement with the teeth of the ratchet wheel 31, the oscillations of the lever 29 intermittently move the floor 6 a predetermined maximum distance in the direction of the arrow $x$, Fig. 1, i. e. toward the base of the rising run 3 of the spike apron 2, with each forward movement of the lever 29.

Loosely mounted on the shaft 12, adjacent the lever 29, is an arcuate shield or guard 40. This shield is provided with a lever 41 to which is pivotally connected one end of a link 42, the opposite end of the link 42 being pivotally connected to one of the trucks 16 of the carriage which supports the movable wall 13 of the supplementary hopper 15.

In operation of the device, a mass or bulk of fibrous stock is placed in the hopper 5, on the movable floor 6 thereof. As the run 3 of the spike apron 2 rises, the floor 6 of the hopper 5 is advanced intermittently, step by step, toward the base of the rising run 3 of the spike apron 2 and the entrained stock is thereby carried to and delivered against the rising side 3 of the spike apron 2. Prior to the stock which is caught by the spikes 43 of the spike apron 2 reaching the top of the feeder, where the spike apron turns about and over the shaft 35, the entrained stock is leveled off on the spike apron 2 into a layer of predetermined thickness, by the leveling comb 44 of usual construction which operates in the usual manner, through an irregular circular path of travel, indicated by the broken line $y$ in Fig. 1.

The oscillatory motion of the comb 44 removes superfluous stock from the spike apron 2 and carries it downwardly into the supplementary hopper 15, through which a rough layer of stock is simultaneously being carried upwardly by the spike apron 2. As a result of the superfluous stock being thrown and forced downwardly into the supplementary hopper 15, an accumulation of stock takes place within the supplementary hopper 15.

As the accumulation builds up in the supplementary hopper 15, it exerts a pressure against the movable wall 13 of the supplementary hopper 15, in opposition to the force exerted by the counter-weights 25, and gradually moves the wall 13 in a direction away from the spike apron 2, from its full-line position to a maximum outward position shown in broken lines in Fig. 1.

As the wall 13 moves away from the spike apron 2, the rod 42, which is connected at one of its ends to one of the trucks 16 of the carriage supporting the movable wall 13 and at its opposite end to the lever 41 of the ratchet guard 40, rotates the lever 41 about the shaft 12, carrying with it the shield 40 into a position shielding part of the face of the ratchet wheel 31.

The oscillations of the pawl-carrying lever 29 are uniform at all times. As the forward edge 45 of the shield 40 is moved around the ratchet wheel 31, it automatically rides under the pawl 30 and holds it out of action with the teeth of the ratchet wheel 31 for a portion of the oscillatory movement of the lever 29, as determined by the outward movement of the movable wall 13, thus, before the pawl 30 can engage one of the teeth of the ratchet wheel 31, a portion of the floor-moving stroke of the lever 29 and pawl 30 has been spent. The remainder of the normal stroke of the lever 29 and pawl 30 is utilized to advance the floor 6 to an extent less than that to which the floor would normally be moved by the pawl 30 when the shield 40 is entirely removed from the path of the pawl.

From the foregoing, it will be clear that, by varying the extent of movement of the floor 6 toward the rising side 3 of the apron 2, a smaller or greater amount of stock is caused to be picked up by the spike apron 2, from the main hopper 5, while an additional amount is picked up from the accumulation within the supplementary hopper 15. In this way, the accumulation in the supplementary hopper 15 is gradually reduced.

Reduction in the volume of the accumulation in the supplementary hopper 15 permits the movable wall 13 to approach its full-line position, during which the retrogressive means which moves the wall 13 toward the apron 2, maintains a constant uniform pressure against the apron 2 of all the stock within the supplementary hopper 15, including the stock being raised by the apron 2 from the main hopper 5 and the additional stock combed back into the hopper 15, against the spike apron 2. Thus, a layer of substantially uniform thickness, weight and density is carried over the top of the shaft 35 by the apron 2 to be discharged from the apron into the weighing pan 46 of the feeding device.

After a predetermined quantity of stock is dumped into the weighing pan 46, the contents thereof are released therefrom to drop onto the discharge apron of the feeder, in the usual manner and as noted in the earlier of the two previously noted prior patents.

In the handling of cotton fibre, for example, the bulk of stock in the hopper 5 is usually of rather a homogeneous nature, i. e. it is of a substantially uniform density throughout, however, some of the other fibres, such as wool, for example, may be of a more springy or resilient nature or may be subject to matting into lumps. Under such circumstances, the wall 13 is composed of a plurality of laterally-spaced fingers 50, as shown in Fig. 2. Each finger is pivotally mounted at 51 within a channel structure 52 secured to the cross bar 14 of the carriage which supports the wall 13. A spring 53 is provided between one side or leg 54 of the channel 52 and the rear face of the finger 50, or each finger may be overbalanced by a counterweight for normally pressing the front face of the finger into contact with the leg 54 of the channel 52 and all the fingers into a common plane across the hopper. If irregularities in the stock carried upwardly by the apron 2 from the hopper 5 are present, the individual fingers 50 will yield relative to each other under the influence of the spring 53, thus, the stock will be pressed with uniform pressure against the apron 2 across the full width of said apron within the supplementary hopper 15. The leveling comb 44 tends to break up any lumps in returning the surplus stock to the supplementary hopper 15.

Figure 4:
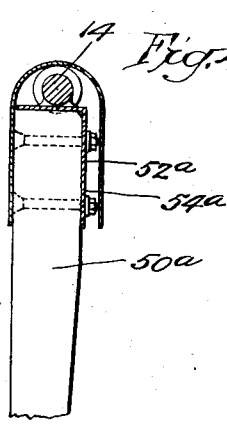
Fig. 4 is a view similar to Fig. 3, illustrating a modification of that portion of the invention shown therein.

In other instances, as shown in Fig. 4, the finger-support may be in the form of an angle bar 52a, and the fingers 50a may be bolted directly to the one leg 54a of the angle bar 52a.

I claim:

1. A fibrous stock feeder, comprising a hopper, a vertically-movable wall adapted to travel upwardly in a single plane solely for removing stock from said hopper, a wall movable laterally toward and from said stock-removing wall in the upper portion of said hopper to press stock against said stock-removing wall, variably movable means in the lower portion of said hopper adjacent said vertically movable stock removing wall for advancing stock toward and into contact with said stock-removing wall, and means controlled by said laterally-movable wall for governing the variable movements of said adjacently disposed stock advancing means.

2. A fibrous stock feeder, comprising a main hopper, a supplementary hopper, a vertical longitudinally-movable wall common to both hoppers, said supplementary hopper including a vertical wall opposite and movable bodily toward and from said common wall, means for effecting adherence of stock in said hoppers to said common wall, a variably movable stock-supporting floor in the main hopper for advancing entrained stock toward and against said common wall, and means controlled by said opposite wall for governing the variable stock advancing movements of said floor.

3. A fibrous stock feeder, comprising a main hopper, a supplementary hopper, a vertical longitudinally-movable wall common to both hoppers, said supplementary hopper including a vertical wall opposite and bodily movable horizontally toward and from said common wall, means for effecting adherence of stock in said hoppers to said common wall, means resiliently urging said opposite wall toward said common wall, means effecting accumulation of stock in said supplementary hopper in opposition to said urging means, a variably movable stock-supporting floor in the main hopper below said supplementary hopper and adjacent said common wall for advancing entrained stock toward and against said common wall, and means controlled by the bodily horizontal movements of said opposite wall for governing said variable stock advancing movements of said floor.

4. A fibrous stock feeder, comprising a main hopper, a supplementary hopper, a vertical longitudinally-movable wall common to both hoppers, said supplementary hopper including a vertical wall opposite and bodily movable horizontally toward and from said common wall, means for effecting adherence of stock in said hoppers to said common wall, means for removing surplus stock from said common wall to effect accumulation of stock in the supplementary hopper and force said opposite wall away from said common wall, retrogressive means urging said opposite wall toward said common wall, a variably movable stock-supporting floor in the main hopper below said supplementary hopper and adjacent said common wall for advancing entrained stock toward and against said common wall, and means controlled by the reactionary movements of said opposite wall for governing the variable stock advancing movements of said floor.

5. A fibrous stock feeder, comprising a main hopper, a supplementary hopper, a vertical longitudinally-movable spike apron forming a wall common to both hoppers, said supplementary hopper including a vertical wall opposite said common wall and bodily movable horizontally toward and from said apron, a variably movable stock-supporting floor in the main hopper adjacent said spike apron, means for advancing said floor toward and the entrained stock into contact with said apron, and means controlled by the back and forth movements of said horizontally movable wall for governing the variable stock advancing movements of said floor.

6. A fibrous stock feeder, comprising a main hopper, a supplementary hopper, a vertical longitudinally-movable spike apron forming a wall common to both hoppers, said supplementary hopper including a vertical wall opposite said common wall and bodily movable horizontally toward and from said apron, means resiliently urging said opposite wall toward said apron, a variably movable stock-supporting floor in the main hopper adjacent said spike apron, means for advancing said floor toward and the entrained stock into contact with said apron, and means controlled by the back and forth movements of said horizontally movable wall for governing the variable stock advancing movements of said floor.

7. A fibrous stock feeder, comprising a main hopper, a supplementary hopper, a vertical longitudinally-movable spike apron forming a wall common to both hoppers, said supplementary hopper including a vertical wall opposite said common wall and bodily movable horizontally toward and from said apron, means for accumulating stock in said supplementary hopper, means resiliently urging said opposite wall toward said apron, a variably movable stock-supporting floor in the main hopper adjacent said spike apron, means for advancing said floor toward and the entrained stock into contact with said apron, and means controlled by the back and forth horizontal movements of said movable wall for governing the stock advancing movements of said floor.

8. A fibrous stock feeder, comprising a main hopper, a supplementary hopper, a vertical longitudinally-movable spike apron forming a wall common to both hoppers, said supplementary hopper including a vertical wall opposite said common wall and bodily movable horizontally toward and from said apron, means for effecting accumulation of stock in the supplementary hopper forcing said opposite wall away from said apron, retrogressive means urging said opposite wall toward said apron, a variably movable stock-supporting floor in the main hopper adjacent said spike apron, means for advancing said floor toward and the entrained stock into contact with said apron, and means controlled by the reactionary movements of said opposite wall for governing said advancing movements of the stock floor.

9. A fibrous stock feeder, comprising a main hopper, a supplementary hopper, a vertical longitudinally-movable spike apron forming a wall common to both hoppers, said supplementary hopper including a vertical wall opposite said common wall and bodily movable horizontally toward and from said apron, means for effecting accumulation of stock in the supplementary hopper forcing said opposite wall away from said apron, retrogressive means including a pivoted counter-weight urging said opposite wall toward said apron, a variably movable stock-supporting floor in the main hopper adjacent said spike apron, means for advancing said floor toward and the entrained stock into contact with said apron, and means controlled by the reactionary movements of said opposite wall for governing the stock advancing movements of said floor.

10. A fibrous stock feeder, comprising a main hopper, a supplementary hopper, a vertical longitudinally-movable spike apron forming a wall common to both hoppers, said supplementary hopper including a vertical wall opposite said common wall and bodily movable horizontally toward and from said apron, a variably movable stock-supporting floor in the main hopper adjacent said spike apron, means for advancing said floor toward and the entrained stock into contact with said apron, and variable means controlled by said opposite wall for governing the variable stock advancing movements of said floor.

11. A fibrous stock feeder, comprising a main hopper, a supplementary hopper, a longitudinally-movable spike apron forming a wall common to both hoppers, said supplementary hopper including a wall opposite said common wall and movable toward and from said apron, a movable stock-supporting floor in the main hopper, pawl and ratchet means for advancing said floor and entrained stock toward said apron, and variable guard means controlled by said opposite wall to expose different extents of the face of the ratchet to the pawl for governing said advancing of said floor.

12. A fibrous stock feeder, comprising a main hopper including relatively-spaced end walls, a supplementary hopper formed between said end walls, a vertical spike apron forming a side wall common to both hoppers, an opposite vertical side wall for said supplementary hopper, a carriage slidably mounted for horizontal movement in said end walls and movably-supporting said opposite wall for bodily movement toward and away from said apron, a variably movable stock-supporting floor in the main hopper adjacent said spike apron, means for advancing said floor toward and the entrained stock into contact with said apron, and means operable by the back and forth horizontal movements of said carriage for governing the extent of movement of said floor.

13. A fibrous stock feeder, comprising a main hopper including relatively-spaced end walls, a supplementary hopper formed between said end walls, a spike apron forming a vertical side wall common to both hoppers, an opposite vertical side wall for said supplementary hopper, a carriage slidably mounted in said end walls and movably-supporting said opposite wall for bodily horizontal movement toward and away from said apron, said movable wall comprising a series of fingers carried by said carriage in laterally-spaced relation between said end walls.

14. A fibrous stock feeder, comprising a main hopper including relatively-spaced end walls, a supplementary hopper formed between said end walls, a spike apron forming a vertical side wall common to both hoppers, an opposite vertical side wall for said supplementary hopper, a carriage slidably mounted in said end walls and movably-supporting said opposite wall for bodily horizontal movement toward and away from said apron, said movable wall comprising a series of fingers carried by said carriage in laterally-spaced relation between said end walls, means resiliently urging said fingers into a common plane on said carriage, a variably movable stock-supporting floor in the main hopper adjacent said spike apron, means for advancing said floor toward and the entrained stock into contact with said apron, and means operable by said carriage for governing the extent of stock advancing movement of said floor.

15. A fibrous stock feeder, comprising a main hopper including relatively-spaced end walls, a supplementary hopper formed between said end walls, a spike apron forming a vertical side wall common to both hoppers, an opposite vertical side wall for said supplementary hopper, a carriage slidably mounted in said end walls and movably-supporting said opposite wall for bodily horizontal movement toward and away from said apron, means resiliently urging said carriage toward said apron, a variably movable stock-supporting floor in the main hopper adjacent said spike apron, means for advancing said floor toward and the entrained stock into contact with said apron, and means operable by said carriage for governing the extent of stock advancing movement of said floor.

16. A fibrous stock feeder, comprising a main hopper including relatively-spaced end walls, a supplementary hopper formed between said end walls, a spike apron forming a side wall common to both hoppers, an opposite side wall for said supplementary hopper, a carriage movably-supporting said opposite wall for movement toward and away from said apron, said movable wall comprising a series of fingers carried by said carriage in laterally-spaced relation between said end walls, means resiliently urging said fingers into a common plane on said carriage, means resiliently urging said carriage toward said apron, a movable stock-supporting floor in the main hopper, means for advancing said floor and entrained stock toward said apron, and means operable by said carriage for governing the extent of movement of said floor.

WILLIAM F. BOKUM.
JOHN W. WEBER.